(12) United States Patent
Farrington (10) Patent No.: US 9,532,556 B2
(45) Date of Patent: Jan. 3, 2017

(54) DEVICE FOR PREVENTING TANGLED LINE FROM ENTERING A FISHING REEL

(71) Applicant: Tyler Farrington, Mishawaka, IN (US)

(72) Inventor: Tyler Farrington, Mishawaka, IN (US)

( * ) Notice: Subject to any disclaimer, the term of this patent is extended or adjusted under 35 U.S.C. 154(b) by 150 days.

(21) Appl. No.: 14/476,068

(22) Filed: Sep. 3, 2014

(65) Prior Publication Data

US 2016/0057985 A1    Mar. 3, 2016

(51) Int. Cl.
| | | |
|---|---|---|
| *A01K 89/0155* | (2006.01) | |
| *A01K 87/04* | (2006.01) | |
| *A01K 97/00* | (2006.01) | |
| *A01K 99/00* | (2006.01) | |
| *A01K 91/06* | (2006.01) | |

(52) U.S. Cl.
CPC ........... *A01K 89/0155* (2013.01); *A01K 87/04* (2013.01); *A01K 91/06* (2013.01); *A01K 97/00* (2013.01); *A01K 99/00* (2013.01)

(58) Field of Classification Search
CPC .... A01K 89/0155; A01K 87/04; A01K 91/06; A01K 97/00; A01K 87/00; A01K 99/00
USPC .......................................... 43/24, 25, 25.2, 4
See application file for complete search history.

(56) References Cited

U.S. PATENT DOCUMENTS

| | | | | |
|---|---|---|---|---|
| 2,740,221 | A | * | 4/1956 | Kono ..................... A01K 87/04 43/24 |
| 2,996,825 | A | | 8/1961 | Tjernlund |
| 3,210,881 | A | * | 10/1965 | Wilson ................... A01K 87/04 24/601.4 |
| 3,545,119 | A | | 12/1970 | Murnan |
| 3,927,488 | A | | 12/1975 | Peddy |
| 5,548,918 | A | | 8/1996 | Varrichione |
| 5,870,848 | A | * | 2/1999 | Ohmura ................. A01K 87/04 43/24 |
| 6,067,742 | A | | 5/2000 | Ohmura |
| 6,418,658 | B1 | | 7/2002 | Knickrehm |
| 6,802,151 | B1 | | 10/2004 | Jochum |
| 7,168,202 | B2 | | 1/2007 | Kohler |
| 2006/0032108 | A1 | * | 2/2006 | Roth ...................... A01K 87/04 43/24 |
| 2015/0272100 | A1 | * | 10/2015 | Bournique ............. A01K 87/08 43/18.1 CT |

FOREIGN PATENT DOCUMENTS

WO    WO 99/60847 A1    12/1999

* cited by examiner

*Primary Examiner* — Gary Hoge
(74) *Attorney, Agent, or Firm* — Woodard, Emhardt, Moriarty, McNett & Henry LLP (57) ABSTRACT

A tangle catching device is configured to prevent a tangle of fishing line from entering a fishing reel of a fishing rod. The device includes a tangle catcher that defines at least in part a line opening through which the fishing line from the fishing reel extends. The tangle catcher has one or more teeth extending radially inward into the line opening from the tangle catcher. The teeth are hook shaped to catch the tangled fishing line.

24 Claims, 6 Drawing Sheets

DEVICE FOR PREVENTING TANGLED LINE FROM ENTERING A FISHING REEL

BACKGROUND

Anyone who goes fishing will eventually experience the frustration associated with their fishing line becoming tangled, either as a result of their own fault or not. For those inexperienced in fishing, such as children, this problem can be further exacerbated by the child continuing to reel in the tangled section, or what is commonly called a "birds nest", into the reel. Once this birds nest of tangled line enters the reel, it is very difficult to remove, and significant amounts of fishing time may be wasted trying to remove this birds nest from the reel instead of fishing. Thus, there is a need for improvement in this field.

SUMMARY OF THE INVENTION

To address the above-mentioned as well as other issues, a unique fishing accessory or device was developed for preventing a birds nest of tangled fishing line from entering a fishing reel. The device includes a tangle catcher that is configured to hook onto or otherwise catch the tangled line before it enters the reel. In one example, the tangle catcher is in the form of projections or teeth that extend radially inward from an eyelet in the device through which the fishing line passes. The tangle catcher can be integrated into one or more guides of a fishing rod or can be a separate accessory attached to the fishing rod and/or the guides of the fishing rod.

In one example of a separate accessory, the device has a clip that fits around the fishing rod at a position near the guide that is located closest to the reel. The device is able to split at the center into two halves that are connected by pins. To install the device onto a fishing rod, the device is split, and the clip end is positioned at the desired location around the fishing rod. The eyelet end of the device is positioned around the fishing line. The pins are then attached to reconnect the two halves of the device.

DESCRIPTION OF THE ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the invention relates.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 1:
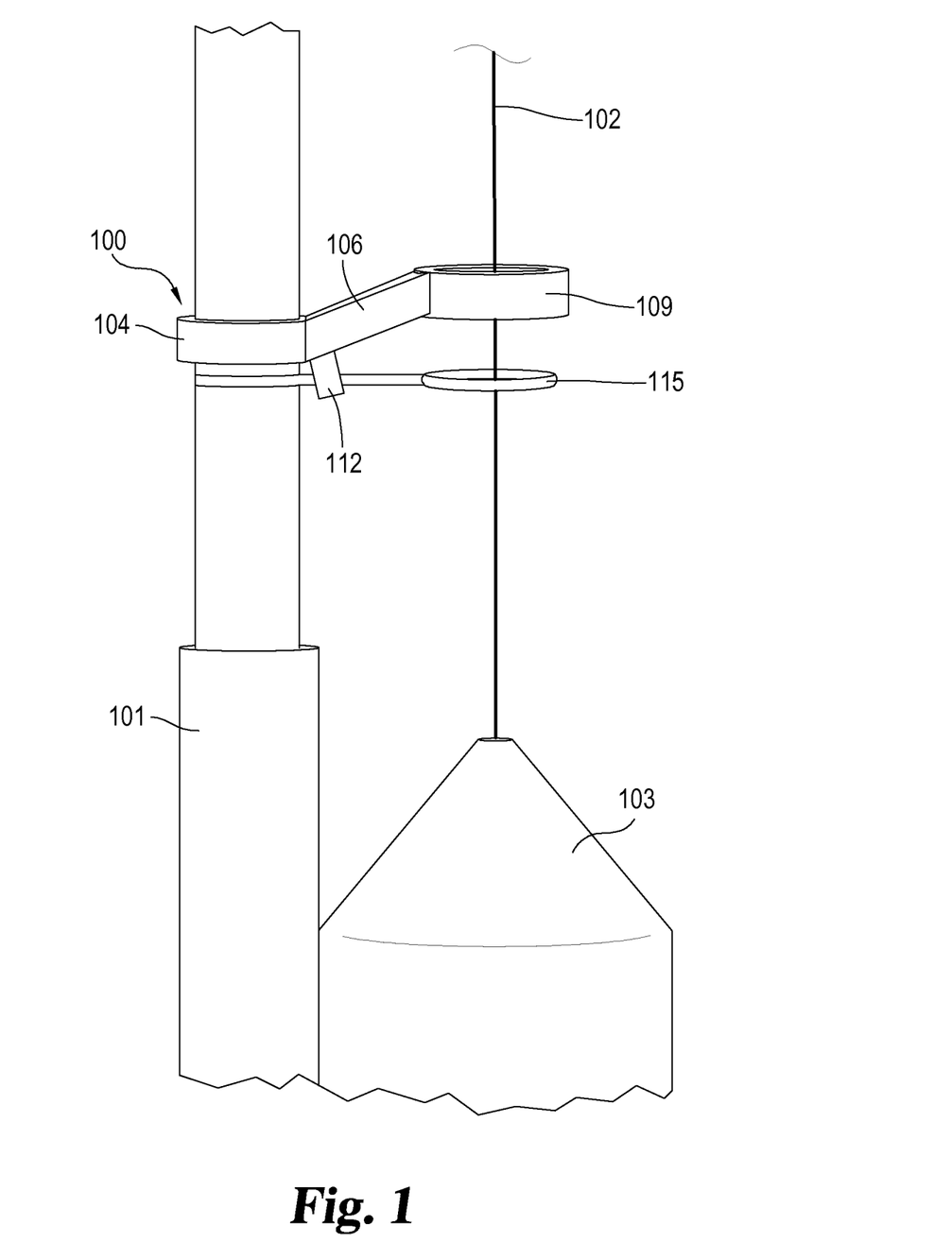
FIG. 1 is a side view of a tangle catching device attached to a fishing rod.

Now referring generally to the drawings, FIG. 1 illustrates one example of a tangle catching device 100 attached to a fishing rod 101. Like most fishing rods, the fishing rod 101 in FIG. 1 includes a fishing line 102 that is wrapped around or otherwise stored on a fishing reel 103 that is configured to cast and reel in the fishing line 102. It should be recognized that the reel 103 can be any type of fishing reel, such as a spinning reel, bait casting reel, fly fishing reel, and conventional reel, to name just a few examples. The tangle catching device 100 is configured to reduce the risk of tangled fishing line, such as in the form of birds nests, from entering the reel 103. In the illustrated example, the tangle catching device 100 is in the form of an accessory that can be attached to the fishing rod 101 after the fishing rod is manufactured, but as will be described below, other forms of the tangle catching device 100 can be attached or integrally formed with the fishing rod 101 when the fishing rod 101 is manufactured. By being a separate accessory, the tangle catching device 100 can be retrofitted to existing fishing rods, and when not needed, the tangle catching device 100 can be easily stored in a fishing tackle box. The tangle catching device 100 includes a rod connector 104 that is configured to secure the tangle catching device 100 to the fishing rod 101. The tangle catching device 100 is configured to be easily removed when not required. For instance, a seasoned fishing expert can attach the tangle catching device 100 to the fishing rod 101 when they loan their fishing rod to a child just learning to fish, and the fishing expert can then readily remove the tangle catching device 100 from the fishing rod 101 when the expert uses the fishing rod 101.

Figure 2:
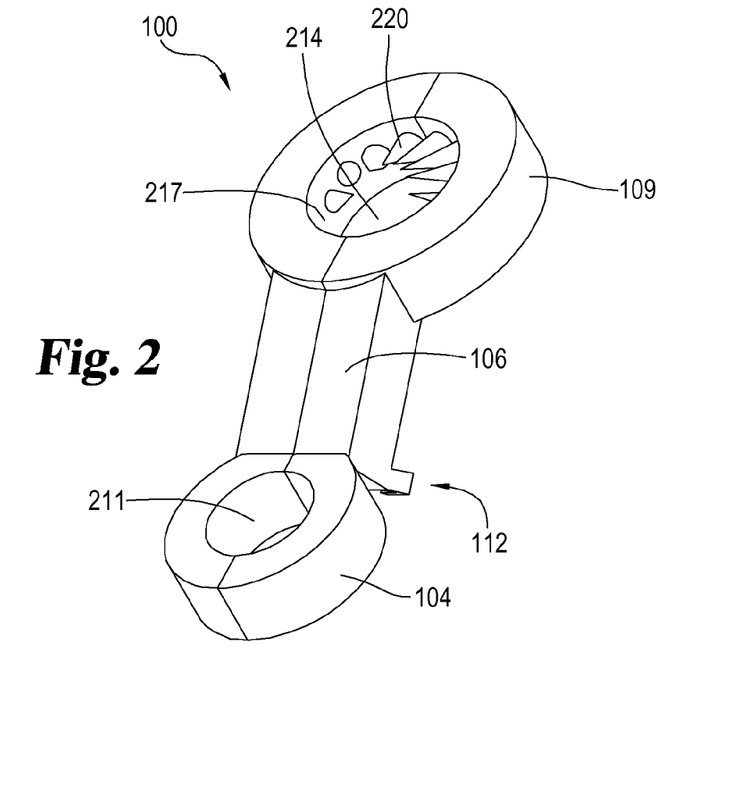
FIG. 2 is a top perspective view of a tangle catching device.

The tangle catching device 100 further includes an extension 106 that connects the rod connector 104 to a tangle catcher 109. As shown, the tangle catching device 100 also has a guide alignment structure 112 that engages a guide (or eyelet) 115 of the fishing rod 101 in order to align the tangle catcher 109 with the guide 115 so that the fishing line 102 is able to pass smoothly through the guide 115. The guide alignment structure 112 in the illustrated example is in the form of a clasp, but it should be appreciated that the guide alignment structure 112 can be configured differently in other examples. As shown, the tangle catcher 109 is aligned with the guide 115 of the fishing rod 101 so that the tangle catcher 109 does not typically contact the fishing line 102 during normal use, such as during casting and reeling in of the fishing line 102. As shown in FIG. 2, the rod connector 104 defines a rod opening 211 in which the fishing rod 101 is received. The rod opening 211 is sized to fit around the pole or rod section of the fishing rod 101. In the illustrated example, the rod opening 211 is circular, but in other examples, the rod opening 211 may be any other shape and/or size needed to secure to the fishing rod 101. The tangle catching device 100 in the illustrated example is positioned along the fishing rod 101 at the last guide 115 before the fishing line 102 enters the reel 103, but in other examples, the tangle catching device 100 can be positioned elsewhere such as at other guides 115 located along the fishing rod 101. As depicted, the tangle catching device 100 is positioned distally relative to the reel 103 such that the guide 115 is located or sandwiched between the reel 103 and the tangle catching device 100. By being located in such a manner, the tangle catching device 100 is braced by the guide 115 when tangled fishing line 102 is caught. In other variations, however, the tangle catching device 100 can be located proximal to the reel 103 such that the tangle catching device 100 is sandwiched between the reel 103 and the guide 115.

The tangle catcher 109 has a fishing line opening 214 through which the fishing line 102 extends. Around the line opening 214, the tangle catcher 109 has an inner surface 217 from where one or more teeth or projections 220 extend in an inner radial direction. In the illustrated example, the teeth 220 have a conical shape so that the bases of the teeth 220 are wider than the ends or tips that extend into opening 214 so as to promote catching of tangles while at the same time not interfering with the normal use of any untangled fishing line 102. In the illustrated examples, the teeth 220 are hook shaped to promote catching of tangles. As used herein, "hook shaped" (and variations thereof) means that all or part of the teeth 220 are curved and/or bent at an angle. In the illustrated example, the teeth 220 are hook shaped because, while substantially straight, the teeth 220 are bent at an angle relative to the rest of the tangle catcher 109 (e.g., the teeth 220 do not extend in the same plane). In other examples, the teeth 220 can be considered hook shaped when curved in a fashion similar to a fishing hook and/or animal claw as well as having a barbed shaped. One or more of the teeth 220 in other examples can be shaped differently so as to not be hook shaped. The spacing between the teeth is sized large enough to allow untangled line 102 to slip or pass through the tangle catcher 109 without the line 102 being caught. Depending on the diameter of the fishing line 102, which is normally determined based upon the strength or test of the fishing line 102, the spacing between the teeth 220 can vary. In one example, the base of the teeth 220 at the inner surface 217 are spaced three-times (3X) the diameter of the fishing line 102 being used. In one specific example, the spacing between the teeth 220 is 0.5 mm, but in other examples, this spacing between the teeth 220 can be different. By the teeth 220 having a conical shape, the spacing at the tips of the teeth 220 is wider so as to further reduce any interference with the fishing line 102 during use. The teeth 220 are sized to be short in order to not extend to the center of the line opening 214 so as to not rub against or otherwise interfere with the movement of the fishing line 102. In one example, the tips of the teeth 220 are spaced away at a particular tolerance from where the fishing line normally travels. In this example, the tips of the teeth 220 end along an imaginary cylinder that is spaced away from where the fishing line 102 travels. In the illustrated example, the tips of the teeth 220 are spaced away from the center of the line opening 214, but in other examples where the fishing line 102 does not travel in the center of the fishing line opening 214, the length of the teeth 220 can be different so as to still not interfere with the fishing line 102. In the illustrated example, the fishing line opening 214 along with the tangle catcher 109 have a cylindrical shape, but these features can be shaped differently in other embodiments (e.g., the tangle catcher 109 and the line opening 214 can have a rectangular, triangular, or irregular cross-sectional shape). It was discovered that having six to eight (6-8) teeth 220 provided the ability to catch tangled fishing line 102 while at the same time not interfere with normal operation of the fishing rod 101. In the illustrated example, the tangle catcher 109 has eight (8) teeth 220, but it should be recognized that other tangle catchers 109 can have more or less teeth 220.

As can be seen in FIG. 2, the teeth 220 only span a partial section of tangle catcher 109 so the teeth 220 occupy an upper arc (or 180°) of the tangle catcher 109. In other words, the teeth 220 cover only half of the circumference of the inner surface 217. With this construction, there is less risk of the teeth 220 interfering with the operation of the fishing rod 101, such as during casting or reeling. For example, when slack, the fishing line 102 will tend to droop due to gravity. The drooping section of the fishing line 102 will then rest against the lower section of the inner surface 217 that does not have the teeth 220. If the teeth 220 were present at the lower section or arc of the tangle catcher 109, there could be a risk that the slackened section of fishing line could snag or even become tangled with the teeth 220. However, in other embodiments the teeth 220 may have different arrangements and span varying amounts of the circumference of the inner surface 217. For example, the teeth 220 may span only a quarter of the circumference the inner surface 217, or the teeth 220 may be located completely around the entire circumference of inner surface 217. In one particular example, the teeth 220 extend around the entire circumference of the inner surface 217 of the tangle catcher 109. The teeth 220 can be integrally formed with the rest of the tangle catcher 109 or can be separate components. For example, the entire device 100, including the teeth 220, can be a unitary structure created by 3D printing or injection molding. In another example, the teeth 220 are metal spikes that are molded or otherwise inserted into the tangle catcher 109 that is made of plastic. In one form, the tangle catching device 100 is made from high polish plastic, such as ABS plastic, but the device 100 can be made from other materials or a combination of materials, such as various types of plastics, metals, composite materials, and the like.

Figure 3:
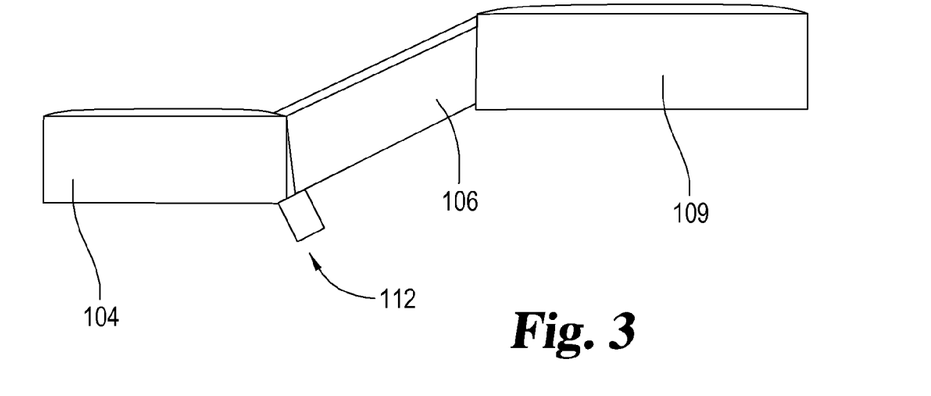
FIG. 3 is a side view of the device shown in FIG. 2.

As shown in FIG. 3, the extension 106 is angled with respect to the rod connector 104 and the tangle catcher 109 so that the rod connector 104 and the tangle catcher 109 are offset from one another (i.e., extend in different planes). With this configuration, the tangle catcher 109 can be positioned properly relative to the eyelet of the guide. In other examples, extension 106 is not angled but extends straight, in the same plane as rod connector 104 and the tangle catcher 109.

Figures 4, 5, 6:
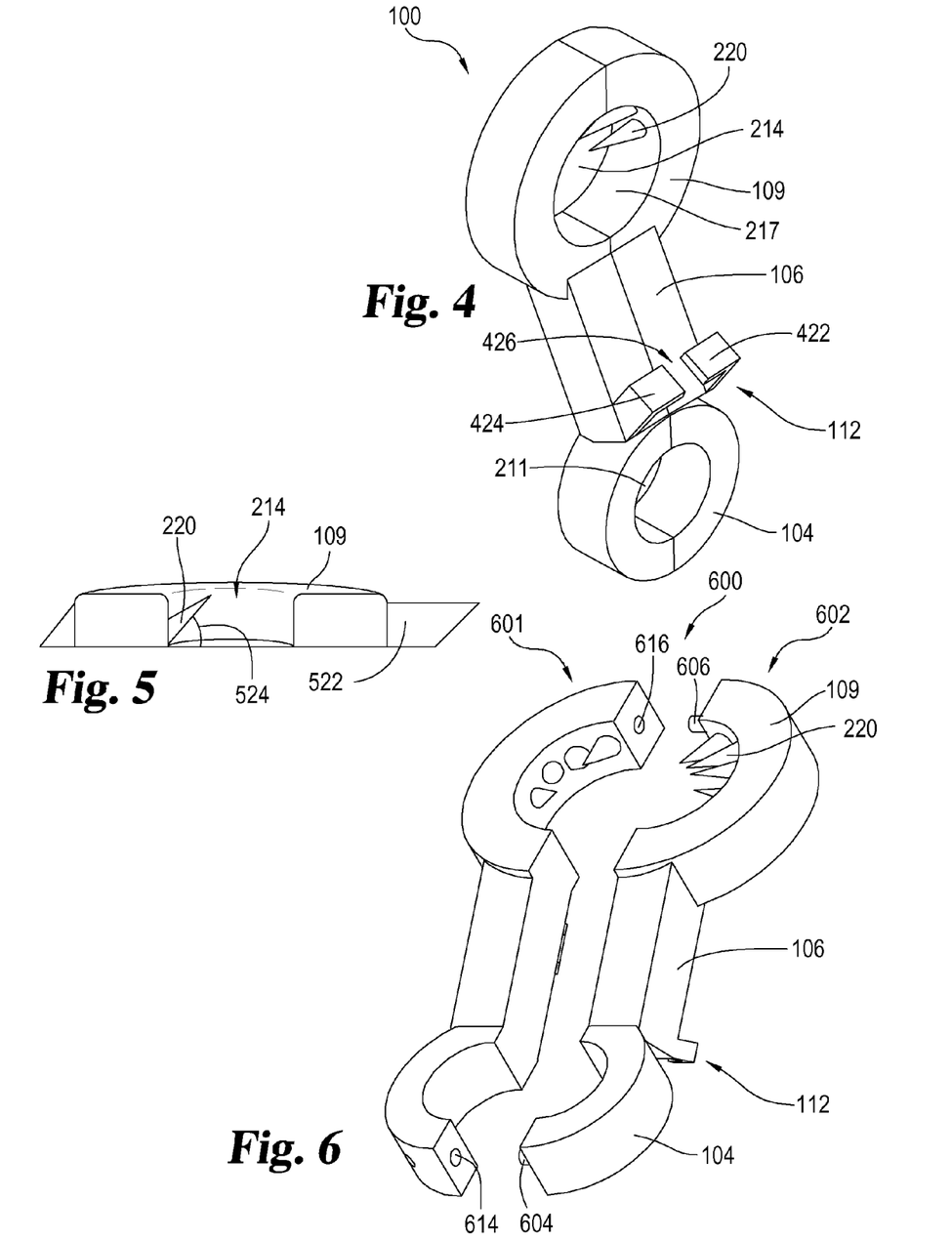
FIG. 4 is a bottom perspective view the device shown in FIG. 2.
FIG. 5 is a view of a guide eyelet end of a tangle catching device.
FIG. 6 is a perspective view of a tangle catching device split into two halves.

FIG. 4 shows a rear perspective view of the tangle catching device 100. As shown, the guide alignment structure 112 is located proximal to the rod connector 104. In the illustrated example, the guide alignment structure 112 is in the form of a clasp that includes opposing latches 422, 424 which define a latch opening 426. When the rod connector 104 is attached to the fishing rod 101, the latches 422, 424 fit around the frame of the guide 115 such that the frame is received in the latch opening 426. With the guide alignment structure 112 secured to the guide 115, the tangle catching device 100 is kept from sliding away from the guide 115 as well as ensures that the tangle catcher 109 remains properly aligned with the eyelet of the guide 115. It should be recognized that the guide alignment structure 112 can be constructed differently in other variations. For example, the guide alignment structure 112 can have a T-shape so as to latch onto the frame of the guide 115.

FIG. 5 shows an enlarged cross-sectional view of the tangle catcher 109. As can be seen, the teeth 220 in FIG. 5 are hook shaped in which the teeth 220 extend obliquely relative to a plane 522 that extends through the tangle catcher 109. The teeth 220 extend or are angled distally toward the top of the fishing rod 101 (i.e., away from the fishing reel 103). In other words, the tip of the teeth 220 extend farther away from the reel 103 as compared to the base of the teeth 220 such that the teeth 220 generally extend in the direction where the fishing line 102 is cast. By being hook shaped, the teeth 220 are able to hook and/or snag any twists, kinks, loops or tangles as the fishing line 102 is reeled into the fishing reel 103. This angle of the teeth 220 is signified by reference numeral 524 in FIG. 5 which shows the angle between the teeth 220 and the plane 522. It was found that having the teeth 220 with the teeth angle 524 from 20 to 50° ensured that the tangle catching device 100 properly caught or straightened any tangles. In one particular example, the angle 524 of the teeth 220 is 45°, but this teeth angle 524 can be different in other examples. In the illustrated example, the teeth 220 are relatively straight, but it is envisioned in other examples that the teeth 220 can be hooked or claw shaped so as to be curved. To protect the teeth 220, the teeth 220 are recessed inside the tangle catcher 109. As shown in FIG. 5, the teeth 220 are located entirely within the fishing line opening 214 such that the tip of the teeth do not extend past the outer surface of the tangle catcher 109. By being recessed within the tangle catcher 109, the teeth 220 are less likely to snag or catch other objects, such as other fishing lines when stored with other fishing poles, lures, clothing, etc., and as a result, any risk of breakage of the teeth 220 is reduced.

In some embodiments, the tangle catching device 100 is formed as a single, unitary piece. This single piece design can be used on a number of different types of fishing rods 101, such as rods with a split pole design. To attach the device 100 to a split pole fishing rod, the butt half of the rod 101 is inserted into the rod opening 211 of the rod connector 104. The device 100 is then slid to the guide 115 located right next to the reel 103. The tangle catching device 100 is then secured to the guide 115 via the guide alignment structure 112. The male ferrule of the tip portion of the rod 101 is then attached to the female ferrule of the butt portion of the rod 101 to complete the assembly of the fishing rod 101. The fishing line 102 can then be threaded through the guide 115 as well as the tangle catcher 109. This type of unitary device 100 can also be attached during assembly of fishing rods having a unitary construction (i.e., not able to split). For example, the device 100 can be installed onto the rod 101 before all of the guides 115 are attached to the rod 101.

In other examples, the tangle catching device 100 is designed to be attached to the fishing rods 101 having a unitary construction after the fishing rod 101 is assembled. FIG. 6 shows a perspective view of one example of such a tangle catching device 600. As shown, the tangle catching device 600 is able to split generally along its center into female 601 and male 602 portions. In the illustrated embodiment, the portions 601, 602 generally form separate halves of the device 600, but it should be recognized that the portions 601, 602 can have different proportional sizes (i.e., one portion having a volume bigger than half and the other smaller than half). This construction allows the tangle catching device 600 to be easily attached to any fishing rod 101, even if the rod 101 is not a split rod. As should be appreciated, the tangle catching device 600 share a number of features in common with the previously discussed device 100. For the sake of brevity as well as clarity, these common features will not be discussed in detail below. Please instead refer to the previous discussion regarding these features. As depicted, the portions 601, 602 of the device 600 are connected by pins 604, 606 that extend from the male portion 602 and fit into pin openings 614, 616 of the female portion 601. The first pin 604 is located on the inner end surface of the rod connector 104, while second pin 606 is located on the inner end surface of the tangle catcher 109. The pin openings 614, 616 are located on the female portion 601 of the device 600 that match or mirror the locations of the pins 604, 606 on the male portion 602 of the device 600.

To attach the two portions 601, 602 together, the pins 604, 606 on the male portion 602 are aligned with corresponding openings 614, 616 on the female portion 601, and the two portions 601, 602 are snapped together by fitting the pins 604, 606 into the corresponding openings 614, 616. The pins 604, 606 are sized to fit tightly within the openings 614, 616 so there is some force required to attach and detach the portions 601, 602. The force required should be enough to allow the halves to remain connected while the device is attached to a fishing rod 101 and during use. However, the force required to detach the halves should allow the user to easily remove device 600 from a fishing rod 101 when desired. The tangle catching device 600 can be constructed differently in other embodiments. For example, the tangle catching device 600 in other variations is not able to split completely into two portions, but instead opens using a hinge at one end. The hinge for example can be located either at rod connector 104 or tangle catcher 109 as well as elsewhere.

To use it, the tangle catching device 600 is attached to the fishing rod 101 near the guide 115 closest to reel 103. The device 600 is split into the two portions 601, 602 and the rod extension 106 is placed at the desired location along the length of the fishing rod. The portions 601, 602 are positioned so that the rod 101 fits inside opening 211 of the rod connector 104. Similarly, the fishing line 102 is positioned so that it is located within the opening 214 of the tangle catcher 109. Once properly situated, the user snaps the portions 601, 602 of the device 600 together. At the same time, the guide alignment structure 112 snaps around the guide 115 so that the device is properly aligned and not able to slide along the rod 101.

Figure 7:
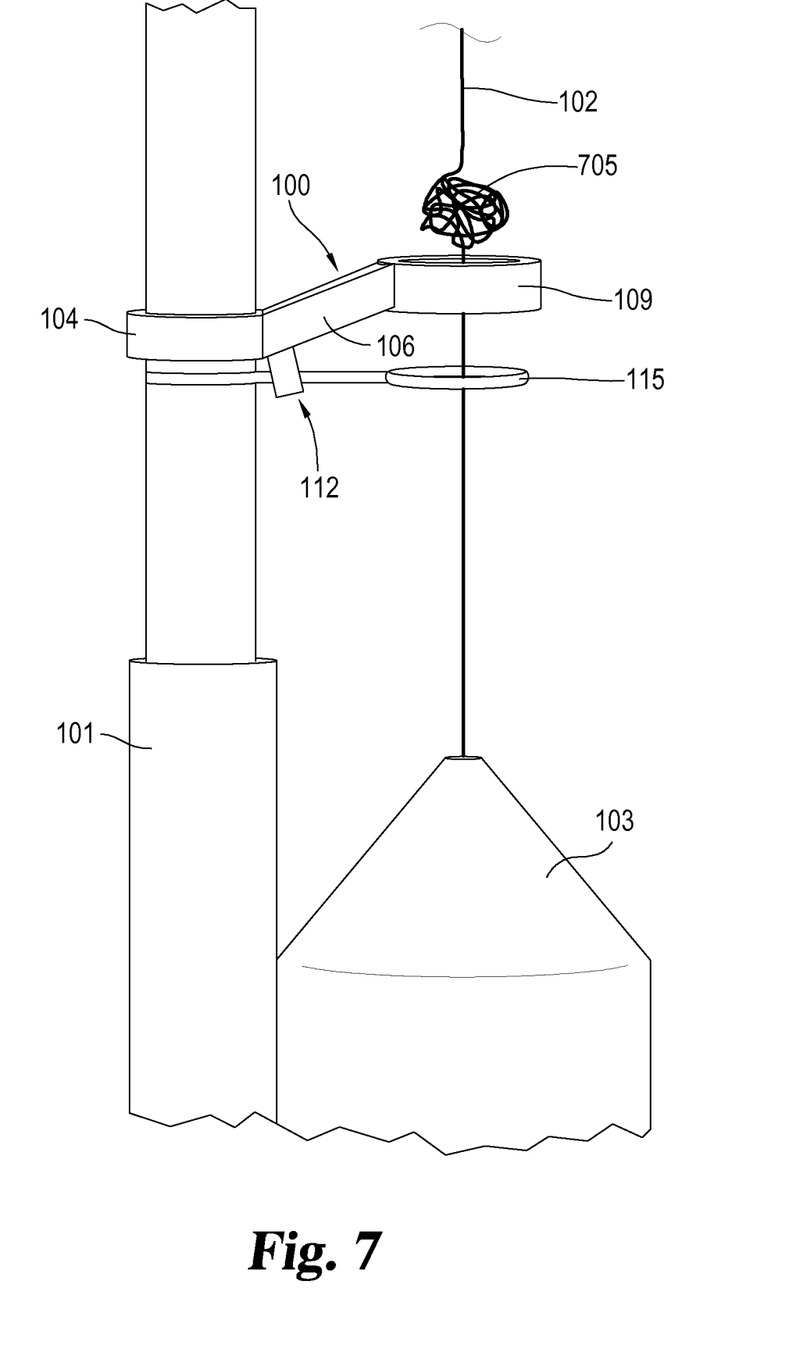
FIG. 7 is a side view of a tangle catching device attached to a fishing rod with a tangle in the fishing line.

A technique for preventing tangles or birds nests of fishing line 102 from entering the reel 103 with the tangle catching device 100 will now be described with reference to FIG. 7. As the fishing rod 101 is cast or reeled, the line 102 passes through the opening 214 of the tangle catcher 109. As long as there are no tangles and/or twists, the fishing line 102 will slide smoothly through the opening 214 without any substantial interference by not getting caught on the teeth 220. However, if there is a twist, kink, tangle, knot, and/or birds nest 705 in the line 102, any resulting loops, twists, knots, etc. in the fishing line 102 will be snagged by the hook-shaped teeth 220 (see e.g., FIG. 5). Because the line 102 is stuck in teeth 220, the user will be unable to reel the line any further. This prevents the tangled line 705 from entering the reel 103 where the tangled line 705 could cause any number of problems, such as further reeling of the fishing line 102, jamming the reel 103, etc., and where the tangled line 705 would be difficult to remove. Once the line 102 is stopped, the user can take any needed additional steps to correct the issue, such as untangling or cutting the fishing line 102. For some smaller tangles or twists 705, the teeth 220 are able to act like a comb and untangle the line 102 without any action needed to be taken on the part of the user.

Figure 8:
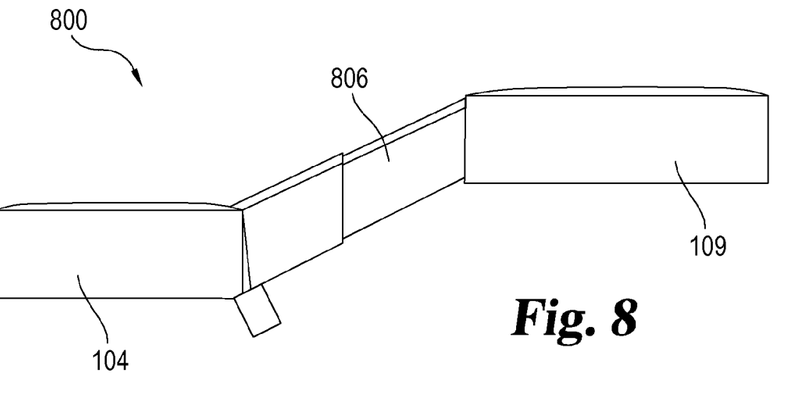
FIG. 8 is a side view of a tangle catching device with an adjustable extension piece in an extended position.
Figure 9:
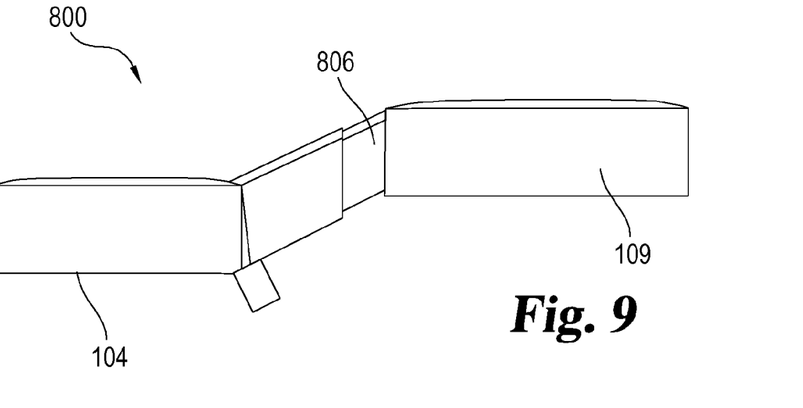
FIG. 9 is a side view of a tangle catching device with an adjustable extension piece in a retracted position.

The eyelets of all guides 115 are not positioned or sized the same. Consequently, if not addressed, the tangle catcher 109 might not be properly aligned in some situations. FIGS. 8 and 9 show an embodiment of a tangle catching device 800 with a telescoping extension piece 806 that allows the user to adjust the position of the tangle catcher 109 with respect to the rod connector 104 in order to properly align the tangle catcher 109. FIG. 8 shows the extension piece 806 in an extended position, while FIG. 9 shows extension piece 806 when it is retracted. This ability to extend and retract (or be located anywhere in between) allows the tangle catching device 800 to be used in conjunction with a wide variety of guides.

Figure 10:
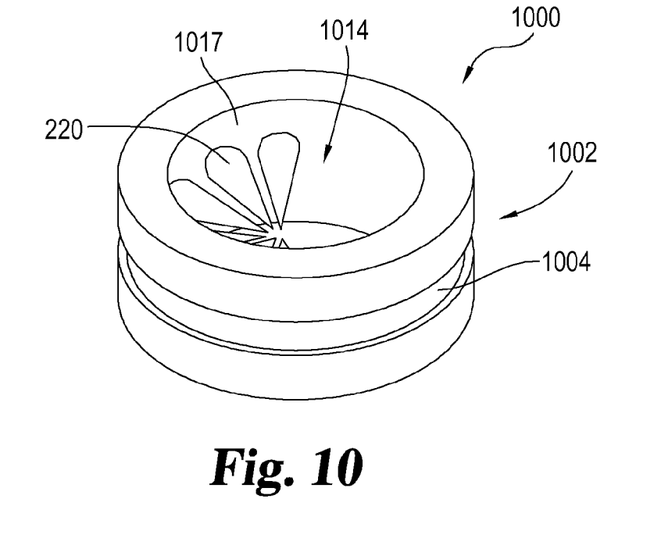
FIG. 10 is a view of an embodiment of a tangle catching device that connects directly to a guide eyelet.

FIG. 9 shows an example of a tangle catching device 1000 configured to directly connect to the guide 115 of the fishing rod 101 rather than being connected to the pole. This design reduces the weight of the device 1000 as well as simplifies attachment of the device to the fishing rod 101. In the illustrated example, the tangle catching device 1000 has a full cylindrical shape so the device 1000 completely fits inside the eyelet of the guide 115. In other examples, the device 1000 has a semi-circular shape that covers only a portion of the eyelet. The tangle catching device 1000 includes a guide coupling structure 1002 configured to secure the tangle catching device to the eyelet of the guide 115. In the illustrated example, the guide coupling structure includes a groove 1004 defined around the circumference of the tangle catching device 1000 that is designed to snap onto the eyelet of the guide 115. The diameter of the eyelet is greater than groove 1004, yet smaller than the outer diameter of the device 1000 so as to allow the device 1000 to be snapped onto the eyelet such that the eyelet rests in groove 1004. The device 1000 in other examples can be attached to the guide 115 in other manners. Similar to the previously described tangle catching devices, the tangle catching device 1000 in FIG. 10 has an opening 1014 and an inner surface 1017 with the teeth 220 of the type described before that are attached to the inner surface 1017 and extend radially away from the inner surface 1017 into the opening 1014. Like before, the teeth 220 are hook shaped so as to catch or remove any tangles 705 in the fishing line 102 (see e.g., FIG. 5).

Figure 11:
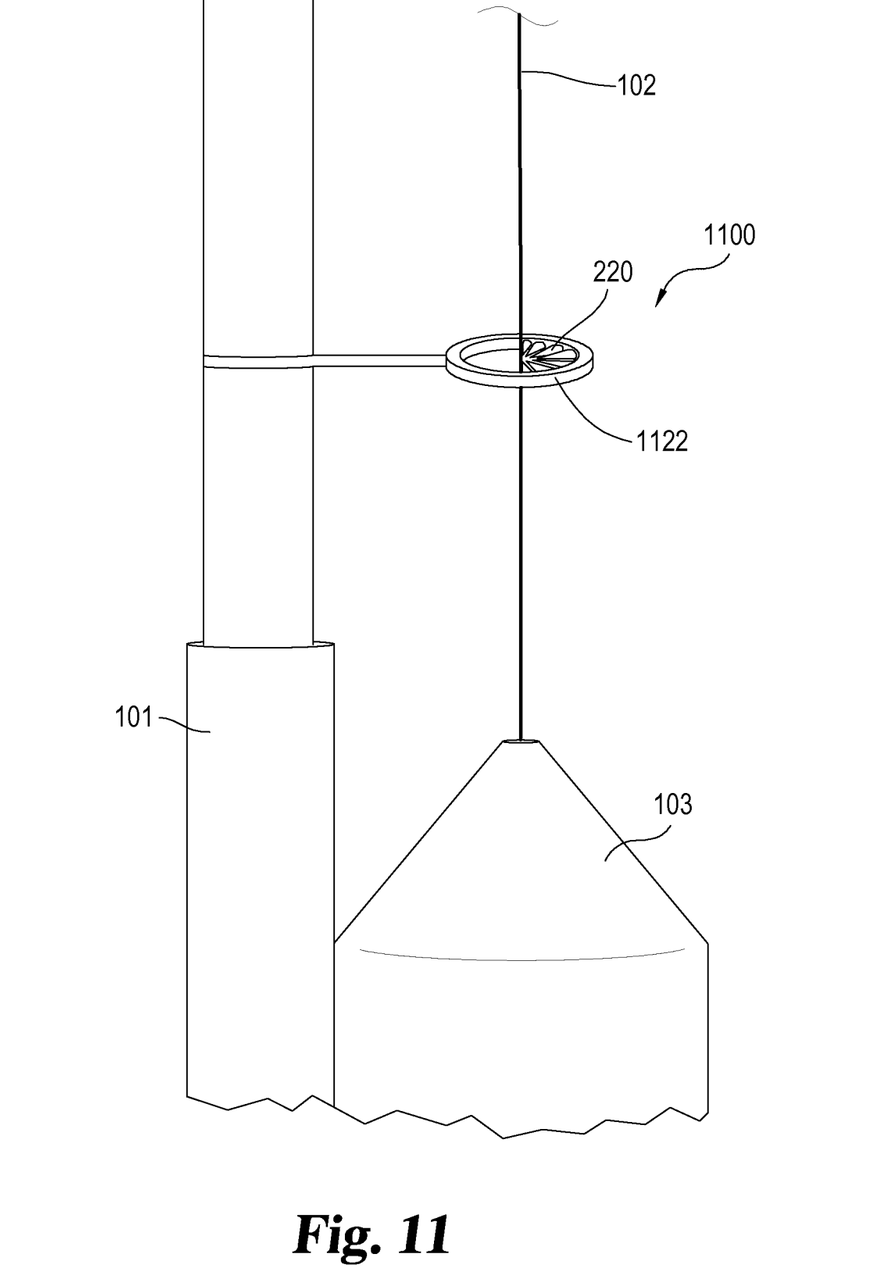
FIG. 11 is a side view of a tangle catching device that is integral to the guide eyelet of a fishing rod.

FIG. 11 shows an example of a tangle catching device 1100 where the teeth 220 are integral to a guide eyelet 1122 of fishing rod 101. In this example, the tangle catching device 1100 is not a separate piece that attaches to fishing rod 101. Instead, the tangle catching device 1100 acts as the final guide before the reel of fishing rod 101, yet the tangle catching device 1100 still includes the teeth 220 that catch the tangles 705 in the fishing line 102 before the tangles 705 enter the reel 103.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A tangle catching device for preventing a tangle of fishing line from entering a fishing reel of a fishing rod, comprising:
    a tangle catcher defining at least in part a line opening through which the fishing line from the fishing reel extends;
    the tangle catcher having one or more teeth extending radially inward into the line opening from the tangle catcher;
    the teeth being hook shaped to catch the tangled fishing line; and,
    wherein the teeth have tips that are angled away from the fishing reel when installed on the fishing rod.

2. The device of claim 1, wherein the teeth are only positioned around a portion of the line opening to minimize interference with the fishing line during use.

3. The device of claim 1, wherein the teeth are recessed within the line opening of the tangle catcher to prevent the teeth from snagging on other objects.

4. The device of claim 1, wherein the teeth are angled to have a teeth angle from 20 to 50°.

5. The device of claim 1, wherein the teeth are separated apart from one another at a space that is at least 3 times the diameter of the fishing line.

6. The device of claim 5, wherein the teeth are separated by at least 0.5 mm.

7. The device of claim 1, wherein the teeth have a conical shape.

8. The device of claim 1, wherein the teeth have tips that are angled away from the fishing reel when installed on the fishing rod.

9. The device of claim 1, further comprising:
    a rod connector configured to connect the tangle catcher to the fishing rod.

10. The device of claim 9, further comprising:
    an extension connecting the rod connector.

11. The device of claim 10, wherein the extension is angled to align the tangle catcher with a guide of the fishing rod.

12. The device of claim 10, wherein the extension is a telescoping extension configured to align the tangle catcher with a guide of the fishing rod.

13. The device of claim 1, further comprising:
    a guide alignment structure configured to couple to a guide of the fishing rod for aligning the tangle catcher with the guide.

14. The device of claim 1, wherein the device has a unitary construction.

15. The device of claim 1, wherein the device includes at least two portions that are snap fitted together.

16. The device of claim 1, further comprising:
    a guide coupling structure configured to secure the tangle catcher to an eyelet of a guide of the fishing rod.

17. The device of claim 1, wherein the tangle catcher is integrally formed with a guide of the fishing rod.

18. The device of claim 1, wherein the tangle catcher is configured to attach to a guide of the fishing rod at a position wherein the guide is located between the tangle catcher and the fishing reel.

19. A method, comprising:
    reeling a fishing line onto a fishing reel through an opening of a tangle catcher that includes one or more teeth that are hook shaped inside the opening; and
    catching a tangle of the fishing line before the tangle enters the fishing reel by hooking the tangle on one or more of the teeth of the tangle catcher.

20. The method of claim 19, further comprising:
    attaching the tangle catcher to a fishing rod at or proximal to a guide of the fishing rod.

21. A tangle catching device for preventing a tangle of fishing line from entering a fishing reel of a fishing rod, comprising:

a tangle catcher defining at least in part a line opening through which the fishing line from the fishing reel extends;

the tangle catcher having one or more teeth extending radially inward into the line opening from the tangle catcher; and the teeth being hook shaped to catch the tangled fishing line; and, wherein the teeth are angled to have a teeth angle from 20 to 50°.

22. The device of claim 21, wherein the tangle catcher is integrally formed with a guide of the fishing rod.

23. A tangle catching device for preventing a tangle of fishing line from entering a fishing reel of a fishing rod comprising:

a tangle catcher defining at least in part a line opening through which the fishing line from the fishing reel extends;

the tangle catcher having one or more teeth extending radially inward into the line opening from the tangle catcher;

the teeth being hook shaped to catch the tangled fishing line; and, wherein the teeth are exposed when the tangle catcher is assembled on the fishing rod.

24. The device of claim 23, wherein the tangle catcher is integrally formed with a guide of the fishing rod.

* * * * *

UNITED STATES PATENT AND TRADEMARK OFFICE
CERTIFICATE OF CORRECTION

PATENT NO. : 9,532,556 B2
APPLICATION NO. : 14/476068
DATED : January 3, 2017
INVENTOR(S) : Tyler Farrington It is certified that error appears in the above-identified patent and that said Letters Patent is hereby corrected as shown below:

On the Title Page

Delete the title page and substitute the attached title page therefor.

In the Claims

Column 8, Claim 8, Lines 24-26, remove claim 8.

Signed and Sealed this
Twenty-first Day of March, 2017

Michelle K. Lee
*Director of the United States Patent and Trademark Office*

(12) United States Patent
Farrington

(10) Patent No.: US 9,532,556 B2
(45) Date of Patent: Jan. 3, 2017

(54) DEVICE FOR PREVENTING TANGLED LINE FROM ENTERING A FISHING REEL

(71) Applicant: Tyler Farrington, Mishawaka, IN (US)

(72) Inventor: Tyler Farrington, Mishawaka, IN (US)

(*) Notice: Subject to any disclaimer, the term of this patent is extended or adjusted under 35 U.S.C. 154(b) by 150 days.

(21) Appl. No.: 14/476,068

(22) Filed: Sep. 3, 2014

(65) Prior Publication Data

US 2016/0057985 A1  Mar. 3, 2016

(51) Int. Cl.
*A01K 89/0155* (2006.01)
*A01K 87/04* (2006.01)
*A01K 97/00* (2006.01)
*A01K 99/00* (2006.01)
*A01K 91/06* (2006.01)

(52) U.S. Cl.
CPC ......... *A01K 89/0155* (2013.01); *A01K 87/04* (2013.01); *A01K 91/06* (2013.01); *A01K 97/00* (2013.01); *A01K 99/00* (2013.01)

(58) Field of Classification Search
CPC .... A01K 89/0155; A01K 87/04; A01K 91/06; A01K 97/00; A01K 87/00; A01K 99/00
USPC .............................. 43/24, 25, 25.2, 4
See application file for complete search history.

(56) References Cited

U.S. PATENT DOCUMENTS

| | | | |
|---|---|---|---|
| 2,740,221 A * | 4/1956 | Kosso | A01K 87/04 43/24 |
| 2,996,825 A | 8/1961 | Tjemlund | |
| 3,210,881 A * | 10/1965 | Wilson | A01K 87/04 24/601.4 |
| 3,545,119 A | 12/1970 | Murnan | |
| 3,927,488 A | 12/1975 | Peddy | |
| 5,548,918 A | 8/1996 | Varrichione | |
| 5,870,848 A * | 2/1999 | Ohsuura | A01K 87/04 43/24 |
| 6,067,742 A | 5/2000 | Ohsuura | |
| 6,418,658 B1 | 7/2002 | Knickrehm | |
| 6,802,151 B1 | 10/2004 | Jochum | |
| 7,168,202 B2 | 1/2007 | Kohler | |
| 2006/0032108 A1 * | 2/2006 | Roth | A01K 87/04 43/24 |
| 2015/0272166 A1 * | 10/2015 | Bourrique | A01K 87/08 43/18.1 CT |

FOREIGN PATENT DOCUMENTS

WO  WO 99/66847 A1  12/1999

* cited by examiner

*Primary Examiner* — Gary Hoge
(74) *Attorney, Agent, or Firm* — Woodard, Emhardt, Moriarty, McNett & Henry LLP

(57) ABSTRACT

A tangle catching device is configured to prevent a tangle of fishing line from entering a fishing reel of a fishing rod. The device includes a tangle catcher that defines at least in part a line opening through which the fishing line from the fishing reel extends. The tangle catcher has one or more teeth extending radially inward into the line opening from the tangle catcher. The teeth are hook shaped to catch the tangled fishing line.

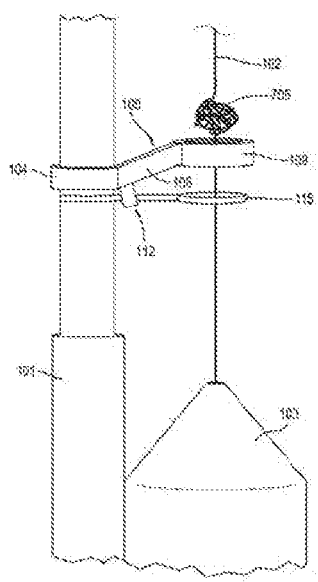

23 Claims, 6 Drawing Sheets